United States Patent
Donderici et al.

(10) Patent No.: US 10,436,929 B2
(45) Date of Patent: Oct. 8, 2019

(54) FRACTURE SENSING SYSTEM AND METHOD

(71) Applicant: Halliburton Energy Services, Inc., Houston, TX (US)

(72) Inventors: Burkay Donderici, Houston, TX (US); Paul F. Rodney, Spring, TX (US); Haluk Vefa Ersoz, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/434,084

(22) PCT Filed: Oct. 11, 2012

(86) PCT No.: PCT/US2012/059646
§ 371 (c)(1),
(2) Date: Apr. 7, 2015

(87) PCT Pub. No.: WO2014/058425
PCT Pub. Date: Apr. 17, 2014

(65) Prior Publication Data
US 2015/0276969 A1 Oct. 1, 2015

(51) Int. Cl.
*G01V 3/26* (2006.01)
*E21B 43/26* (2006.01)
(Continued)

(52) U.S. Cl.
CPC .............. *G01V 3/26* (2013.01); *E21B 43/26* (2013.01); *E21B 47/026* (2013.01); *E21B 47/09* (2013.01);
(Continued)

(58) Field of Classification Search
CPC ..... G01V 3/26; G01V 3/30; G01V 3/81; E21B 43/267; E21B 47/09
See application file for complete search history.

(56) References Cited

U.S. PATENT DOCUMENTS 6,330,914 B1 * 12/2001 Hocking .................. C09K 8/80
166/250.1
7,082,993 B2    8/2006 Ayoub et al.
(Continued)

FOREIGN PATENT DOCUMENTS

WO    2006/051249 A1    5/2006
WO    2009/035436 A1    3/2009
(Continued)

OTHER PUBLICATIONS

International Search Report and Written Opinion issued in related PCT Application No. PCT/US2012/059646 dated Jun. 25, 2013, 9 pages.
(Continued)

*Primary Examiner* — Huy Q Phan
*Assistant Examiner* — Adam S Clarke
(74) *Attorney, Agent, or Firm* — Benjamin Fite; Baker Botts L.L.P.

(57) ABSTRACT

A fracture sensing system and method is disclosed herein. The method may include positioning a transmitter and a receiver in a borehole and magnetizing a casing disposed within the borehole to magnetically saturate the casing. The transmitter and receiver may be located inside or outside of the casing. The method may also include inducing with the transmitter an electromagnetic field in a formation surrounding the borehole. The method may also comprise receiving the induced electromagnetic field at the receiver. The
(Continued)

induced electromagnetic field may identify a fracture within the formation based, at least in part, on a contrast agent within the fracture.

20 Claims, 5 Drawing Sheets

(51) Int. Cl.
*E21B 47/09* (2012.01)
*E21B 47/10* (2012.01)
*E21B 47/026* (2006.01)

(52) U.S. Cl.
CPC ...... *E21B 47/0905* (2013.01); *E21B 47/1015* (2013.01)

(56) References Cited

U.S. PATENT DOCUMENTS

| | | |
|---|---|---|
| 7,424,911 B2 | 9/2008 | McCarthy et al. |
| 7,819,181 B2 | 10/2010 | Entov et al. |
| 7,852,708 B2 | 12/2010 | Poitzsch et al. |
| 2003/0173072 A1* | 9/2003 | Vinegar ............... B09C 1/02 166/66.5 |
| 2005/0183858 A1 | 8/2005 | Ayoub et al. |
| 2005/0183859 A1* | 8/2005 | Seams ............... E21B 43/006 166/263 |
| 2005/0274510 A1 | 12/2005 | Nguyen et al. |
| 2006/0102345 A1* | 5/2006 | McCarthy ............ C09K 8/805 166/250.1 |
| 2007/0131424 A1* | 6/2007 | Fripp ............... C09K 8/80 166/280.2 |
| 2007/0256830 A1* | 11/2007 | Entov ............... E21B 43/26 166/250.1 |
| 2008/0290876 A1 | 11/2008 | Ameen |
| 2009/0166030 A1 | 7/2009 | Zhuravlev et al. |
| 2009/0179649 A1 | 7/2009 | Schmidt et al. |
| 2009/0195244 A1* | 8/2009 | Mouget ............... G01V 3/28 324/221 |
| 2009/0285051 A1* | 11/2009 | Poitzsch ............ G01V 1/38 367/19 |
| 2009/0288820 A1 | 11/2009 | Barron et al. |
| 2010/0066560 A1 | 3/2010 | McDaniel et al. |
| 2010/0147512 A1 | 6/2010 | Cramer et al. |
| 2011/0108277 A1* | 5/2011 | Dudley ............... E21B 43/2405 166/308.1 |
| 2011/0186290 A1* | 8/2011 | Roddy ............... E21B 43/25 166/253.1 |
| 2012/0152529 A1* | 6/2012 | Eick ............... C09K 8/80 166/250.1 |
| 2012/0194195 A1* | 8/2012 | Wisler ............ E21B 47/02216 324/346 |
| 2012/0215448 A1* | 8/2012 | Hu ............... G01V 3/28 702/7 |
| 2012/0234533 A1* | 9/2012 | Chen ............... E21B 47/082 166/250.01 |
| 2013/0154846 A1* | 6/2013 | Mangione ............ G01V 3/30 340/854.6 |
| 2013/0328693 A1* | 12/2013 | Mohamadi ............ G01V 3/30 340/854.6 |
| 2014/0110103 A1* | 4/2014 | Hyde ............... E21B 47/102 166/248 |
| 2014/0129194 A1* | 5/2014 | Zhdanov ............ G01V 99/005 703/2 |

FOREIGN PATENT DOCUMENTS

| | | |
|---|---|---|
| WO | 2009/137565 A1 | 11/2009 |
| WO | 2009151891 A2 | 12/2009 |
| WO | 2011/022012 A1 | 2/2011 |
| WO | 2011/066525 A2 | 6/2011 |

OTHER PUBLICATIONS

International Preliminary Report on Patentability issued in related PCT Application No. PCT/US2012/059646 dated Dec. 23, 2014, 18 pages.
Second Written Opinion issued in related PCT Application No. PCT/US2012/059646 dated Sep. 10, 2014, 6 pages.
Office Action in related Australian patent application No. 2012392171, dated Nov. 20, 2015 (2 pages).
Office Action in related European patent application No. 12787942.7, dated Feb. 19, 2016 (4 pages).

* cited by examiner

FRACTURE SENSING SYSTEM AND METHOD

CROSS-REFERENCE TO RELATED APPLICATION

The present application is a U.S. National Stage Application of International Application No. PCT/US2012/059646 filed Oct. 11, 2012, which is incorporated herein by reference in its entirety for all purposes.

BACKGROUND

The present disclosure relates generally to well drilling operations and, more particularly, to a fracture sensing system and method.

Once a well is drilled, numerous completion and stimulation operations may be undertaken to complete the well and enhance production from the well. These operations may include cementing a casing into the well, perforating the casing, and fracturing the formation. Hydraulic fracturing is typically used to improve the recovery of hydrocarbons from a formation by applying a fluid pressure to the formation to induce fractures. The fractures may have particular properties, such as volume and position, that can be characterized as complex functions of the geophysical/geomechanical properties of the formation. The formation properties, however, are usually not accurately known, making it challenging to predict the locations of the fractures or precisely control where they are created. In certain cases, borehole seismic surveys may be used to estimate the position of the fracture network. Micro-surveys may also be used to determine fracture orientation using surface tiltmeters. Neither of these techniques, however, can distinguish between fractures that are still open or closed, nor can they provide the volume of the fracture.

FIGURES

Some specific exemplary embodiments of the disclosure may be understood by referring, in part, to the following description and the accompanying drawings.

FIG. 5 illustrates an example fracture sensing method, according to aspects of the present disclosure While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to a fracture sensing system and method.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

According to aspects of the present disclosure, a fracture sensing method is disclosed herein. The method may include positioning a transmitter and a receiver in a borehole and magnetizing a casing disposed within the borehole. Magnetizing the casing may magnetically saturate the casing, thereby reducing signal attenuation through the casing. The method may also comprise inducing with the transmitter an electromagnetic field in a formation surrounding the borehole. The electromagnetic field may be, for example, induced through the casing by a transmitter located inside of the casing, or induced by a transmitter located outside of the casing in a cement layer between the casing and a borehole wall. The method may also comprise receiving the induced electromagnetic field at the receiver. Like the transmitter, the receiver may be located on the outside of the casing in the cement layer, or inside of the casing, where the induced electromagnetic field is received through the casing. As will be discussed below, the induced electromagnetic field may identify a fracture within the formation based, at least in part, on a contrast agent within the fracture.

According to aspects of the present disclosure, a fracture sensing system is disclosed herein. The system may comprise an electromagnet, a transmitter, and a receiver. A control unit may be coupled to the electromagnet, the transmitter, and the receiver. The control unit may cause the electromagnet to magnetize a casing disposed within the borehole. The control unit may also cause the transmitter to induce an electromagnetic field in a formation surrounding the borehole. Additionally, the control unit may receive the induced electromagnetic field through the receiver. The induced electromagnetic field may identify a fracture within the formation based, at least in part, on a contrast agent within the fracture. As will be appreciated by one of ordinary skill in the art in view of this disclosure, the system and method described above may improve the electromagnetic visibility of the fracture, allowing for a determination of at least one fracture characteristic, such as orientation, width, height, and length, as well as a determination of the temperature of the surrounding formation.

Figure 1:
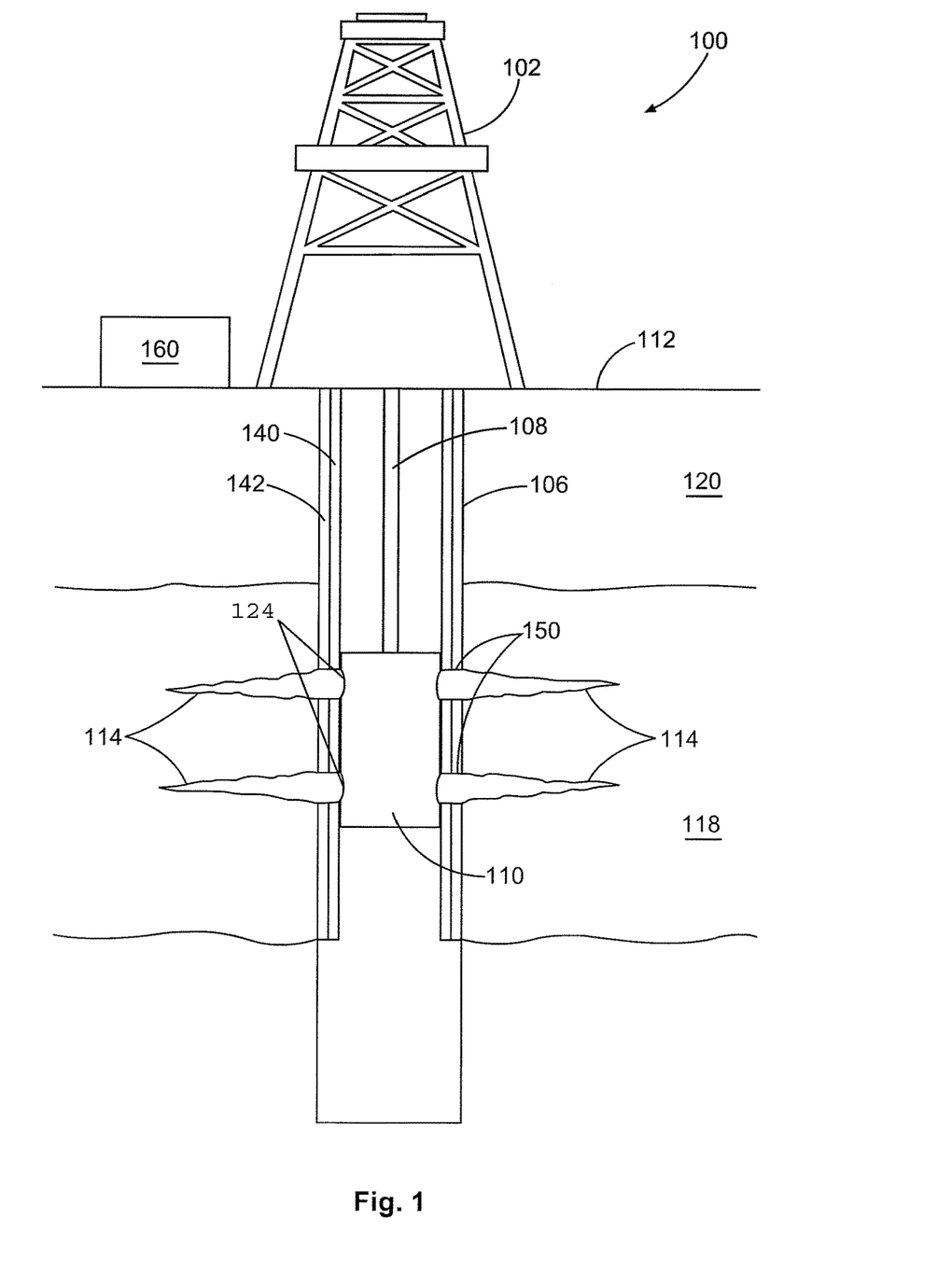
FIG. 1 illustrates an example stimulation system.

FIG. 1 shows an example stimulation system 100. The stimulation system 100 includes a rig 102 mounted at the surface 112, positioned above a borehole 106 within a subterranean formation 120. The rig 102 may be connected via tubing or a coiled tube 108 to a stimulation tool 110. Although a coiled tube 108 is shown, other pipe and connections are possible, as would be appreciated by one of ordinary skill in the art in view of this disclosure. In certain embodiments, the stimulation tool 110 may communicate and receive commands from the control unit 160 positioned at the surface. In certain embodiments, the stimulation tool 110 may also comprise downhole control mechanisms.

The stimulation tool 110 may be inserted into a completed well, with casing 140 cemented into the borehole 106 with cement layer 142. The stimulation tool 110 may be positioned within the borehole 106 either within or adjacent to hydrocarbon formation 118. In certain embodiments, the stimulation tool 110 may both perforate the casing 140 and cement layer 142 and fracture the hydrocarbon formation 118. For example, stimulation system 100 may pump abrasive fluids through ports 124 to create perforations 150 in the casing 140 and cement layer 142, thereby exposing the interior of the casing 140 to the hydrocarbon formation 118. The stimulation tool 110 may similarly hydraulically fracture the hydrocarbon formation 118 by pumping pressurized fluids through the perforations 150 to create cracks or fractures 114 extending from the borehole 106 into the formation 118. The fractures 114 may increase the production of hydrocarbons from the hydrocarbon formation 118. Although the stimulation tool 110 is described as both perforating the well and fracturing the formation, these operations may be performed by multiple tools, and with many different configurations and methods of perforation and fracture, as will be appreciated by one of ordinary skill in view of this disclosure.

Once the fractures 114 are created, it may be desirable to identify certain fracture characteristics such as orientation, height, length, and depth. For example, the fractures may have particular properties, such as volume and position, that can be characterized as complex functions of the geophysical/geomechanical properties of the formation. The formation properties, however, are usually not accurately known, making it challenging to predict the locations of the fractures or precisely control where they are created. Determining the size and location of the fractures may be important for increasing the hydrocarbon recovery from particular formation strata.

Figure 2:
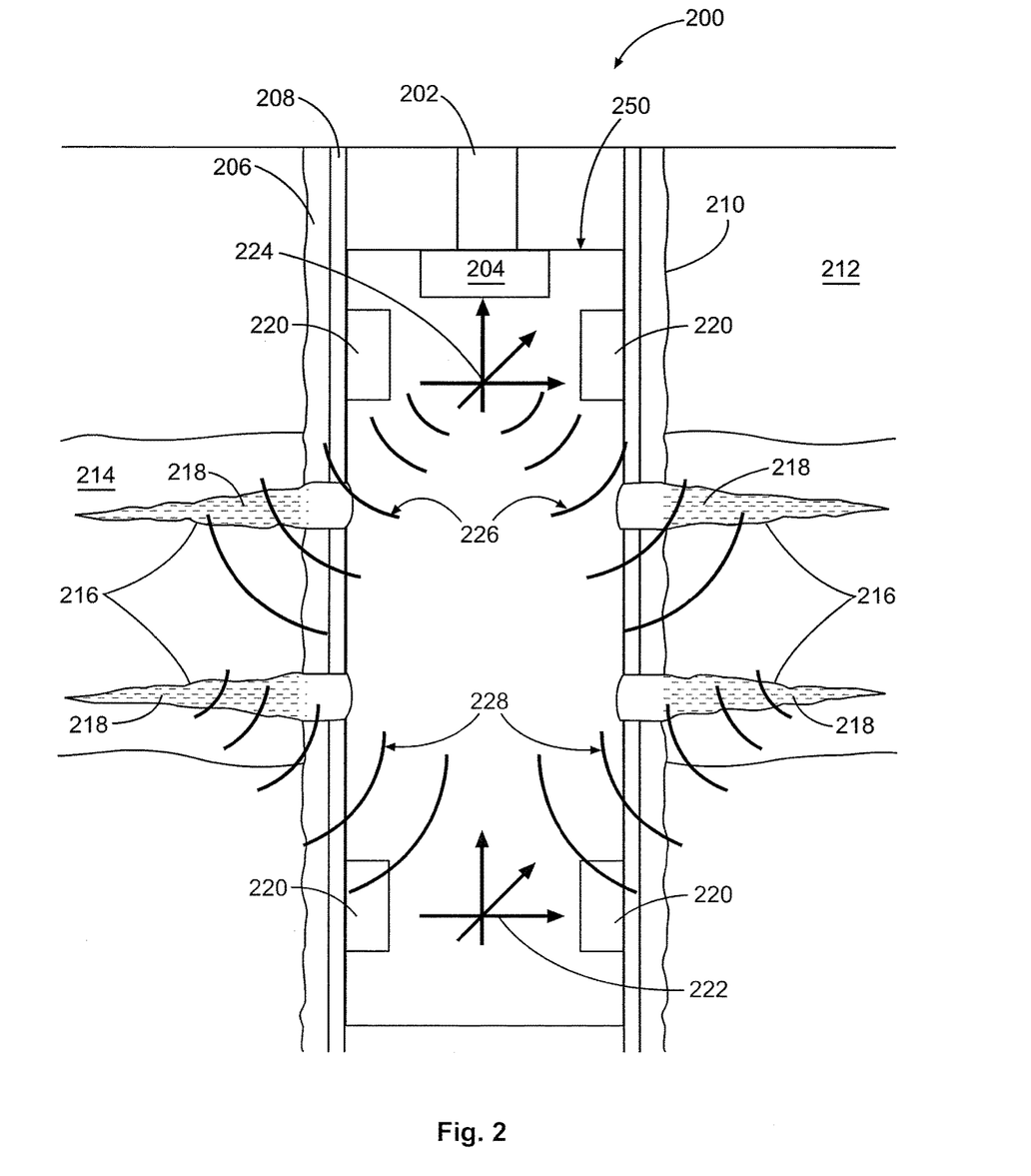
FIG. 2 illustrates an example fracture sensing system and method, according to aspects of the present disclosure.

FIG. 2 shows an example fracture sensing system 200 according to aspects of the present disclosure. In the embodiment shown, the fracture sensing system 200 includes a fracture sensing tool 250 disposed in a completed borehole 210 and coupled to the surface via coiled tubing 202. A casing 208 may be disposed within the borehole 210 and secured by cement layer 206. The fracture sensing tool 250 may comprise a transmitter 224 and a receiver 222. The transmitter may induce an electromagnetic field 226 into formation 212 surrounding the borehole 210. In certain embodiment, inducing the electromagnetic field 226 into the formation 212 surrounding the borehole 210 may comprise inducing an electromagnetic field 226 within fractures 216 in the hydrocarbon formation 214 extending from the borehole 210. The receiver 222 may receive the induced electromagnetic field 226, as indicated by field lines 228. The induced electromagnetic field 228 may identify fractures 216 within the formation based, at least in part, on a contrast agent 218 within the fractures 216.

In certain embodiments, one or both of the transmitter 224 and receiver 222 may be electric or magnetic dipoles with arbitrary orientations. Electric dipoles may comprise, for example, wire antennae, toroid-wound antennae, or electrodes. Magnetic dipoles may comprise, for example, coils of wire or solenoids. In certain embodiments, the transmitter 224 and receiver 222 may include dipoles positioned in the Z axis, dipoles positioned in the X and Y axes, or dipoles positioned in the X, Y, and Z axes. In the embodiment shown in FIG. 2, both the transmitter 224 and receiver 222 comprise tri-axial dipoles, which may beneficially identify the azimuth of the fractures 216. As will be appreciated by one of ordinary skill in view of this disclosure, multiple transmitter and receiver orientations, as well as multiple transmitters and receivers generally, may be used to obtain measurements with different depths of detection. Likewise, measured signals from the multiple receivers can be subtracted to eliminate unwanted signals, as can the ratio of signals derived from different transmitter/receiver spacings.

In certain embodiments, the fracturing sensing tool 250 may further comprise electromagnets 220. The electromagnets 220 may be positioned near an external surface of the tool 250, proximate to the casing 208. The electromagnets 220 may be mechanically activated, such that they can be selectively activated by a control system 204 within the tool, or by a separate control system located at the surface. Example control units and systems will be discussed below with respect to FIG. 4. The casing 208, being made of steel or other metallic material, may attenuated the electromagnetic field 226 induced by the transmitter 224 by absorbing some of the magnetic signal transmitted by the transmitter 224. This attenuation may reduce the strength of the electromagnetic field induced in the formation, thereby decreasing the depth of investigation and the resolution that can be achieved using the electromagnetic field. In certain embodiments, the electromagnets 220 may be triggered to magnetically saturate the casing 208, reducing the signal absorption within the casing 108 and the overall attenuation of the induced electromagnetic field 226. Other configurations of the electromagnets are possible, including magnets on a separate tool from the transmitter and receiver, or permanent magnets that are posited on a dedicated tool and lowered into the borehole when the fracture sensing operations are to be undertaken.

Contrast agent 218 may increase the electromagnetic visibility of the fractures 216, thereby aiding the fracture sensing system 200 to identify the fractures 216 and determine certain fracture characteristics. In certain embodiments, the contrast agent 218 may be injected into the formation as part of the fracturing process, including being used as a proppant in the fracture fluid. In certain other embodiments, the contrast agent may be injected after the fracturing process. The contrast agents 218 may be comprised of material with high magnetic susceptibility so as to increase the magnetic visibility of the fractures 216, as would be appreciated by one of ordinary skill in the art in view of this disclosure. The contrast agents 218 may also be comprised of nanomaterials or nanoparticles that are specifically designed and manufactured to increase the magnetic visibility of the fractures 216.

Figure 3:
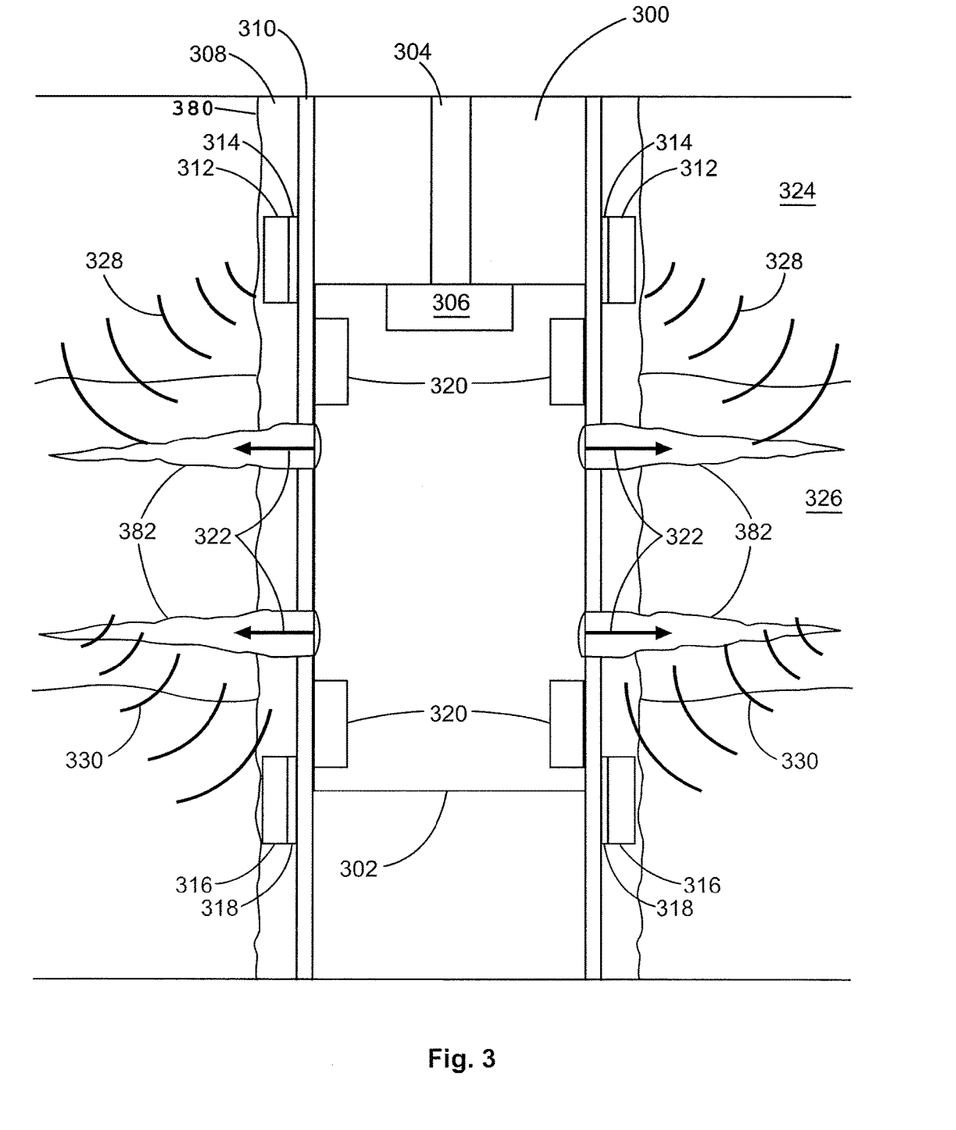
FIG. 3 illustrates an example fracture sensing system and method, according to aspects of the present disclosure.

FIG. 3 illustrates another embodiment of a fracture sensing system 300, according to aspects of the present disclosure. As can be seen, instead of the transmitters 312 and receivers 316 being positioned within the borehole on a fracture sensing tool similar to fracture sensing tool 250 in FIG. 2, the transmitters 312 and receivers 316 may be positioned within a cement layer 308 securing a casing 310 to the borehole 380. In certain embodiments, the transmitters 312 and receivers 316 may be positioned in the borehole during a well completion operation. Notably, by placing the transmitters 312 and receivers 316 outside of the casing 310, transmitters 312 may induce an electromagnetic field 328 in the formation 324 surrounding the borehole 380, and more particularly induce the electromagnetic field 328 into fractures 382 within a hydrocarbon formation 326 extending from the borehole 380, without passing through the casing 310. Likewise, the induced electromagnetic field received by the receivers 316, as indicated by lines 330, need not pass through the casing 310. This may reduce signal absorption and casing attenuation both as the signal is transmitted into the formation and as it is received from the formation.

In certain embodiments, a layer of electrically insulating, high-permeability material, such as ferrite, may be placed between at least one of the transmitters 312 and receivers 316 and the casing 310. The insulative layers are shown as elements 314 and 318 in FIG. 3. The insulative layers 314 and 318 may function to concentrate certain low frequency magnetic signals away from the casing 310, further reducing the absorption of the magnetic signal by the casing 310. The casing 310 may also be magnetized as described above to reduce signal absorption.

The fracturing sensing system shown in FIG. 3 includes a fracturing/injection tool 302 disposed within the borehole 380 and coupled to the surface via coiled tubing 304. In certain embodiments, the tool 302 may hydraulically fracture the formation 326 using high pressure fluid jets 322, causing fractures 382 that extend away from the borehole 380. The high pressure fluid jets 322 may include, for example, contrast agents as proppants. In certain other embodiments, the tool 302 may be designed to inject the contrast agents through fluid jets 322 into pre-existing fractures 382, which were created during an earlier perforation/fracturing process. In either case, it may be desirable to either demagnetize the casing 310 prior to injecting the contrast agent so that the contrast agent is effectively injected into the formation 326, or to inject the contrast agent prior to the casing 310 being magnetically saturated using electromagnets 320. Notably, the tool 302 includes a control unit 306 and electromagnets 320. The control unit 306 may mechanically activate the electromagnets 320 to coincide with the electromagnetic field 328 being induced within the formation 324.

Figure 4:
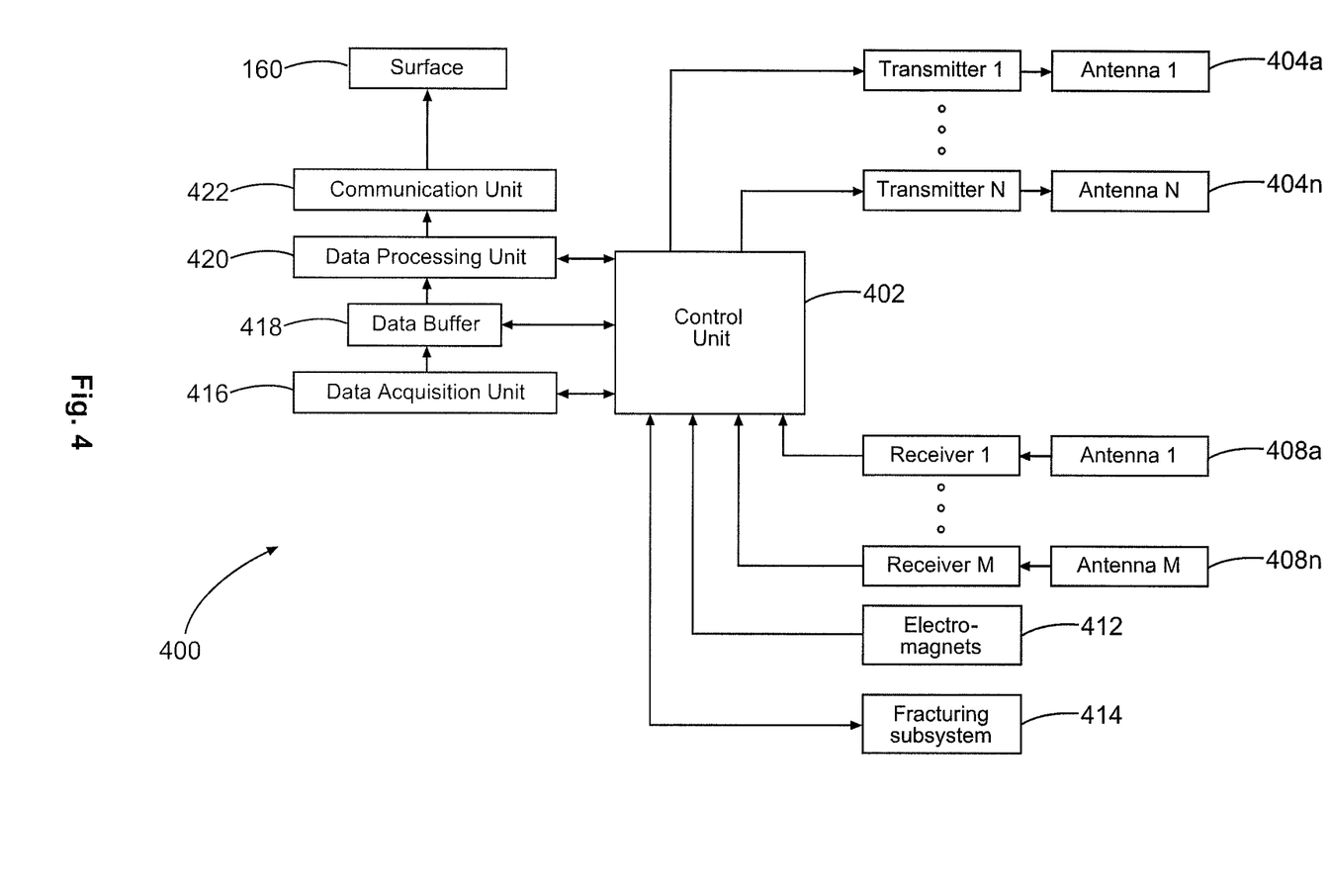
FIG. 4 illustrates a functional diagram of an example fracture sensing system, according to aspects of the present disclosure.

FIG. 4 illustrates a functional diagram of an example fracture sensing system 400, according to aspects of the present disclosure. A fracture sensing system according to aspects of the present disclosure may include a transmitter, a receiver, and an electromagnet, each of which is coupled to a control unit. In the embodiment shown, the fracture sensing system 400 includes an array of transmitters 404a-n, an array of receivers 408a-n, and an electromagnet 412, each coupled to and receiving commands from control unit 402. Each of the transmitters 404a-n may comprise transmitter circuitry coupled to a transmission element, such as an antenna. Likewise, each of the receivers 408a-n may comprise receiver circuitry coupled to a receiver element, such as an antenna.

The control unit 402 may be disposed in a downhole tool, such as fracture sensing tool 250, and may include or communicate with a data acquisition unit 416, a data buffer 418, a data processing unit 420, and a communication unit 422, also disposed in a downhole tool. The control unit 402 may be operable to cause the electromagnet 412 to magnetize a casing disposed within the borehole. Causing the electromagnet 412 to magnetize the casing may include transmitting a command to the electromagnet to mechanically activate the electromagnet. The control unit 402 may be further operable to cause the transmitters 404a-n to induce an electromagnetic field into a formation surrounding the borehole. Once the electromagnetic field has been induced, the control unit 402 may cause the receivers 408a-n to receive the induced electromagnetic field, and transmit signals corresponding to the electromagnetic field to the control unit 402. As described above, the induced electromagnetic field may identify a fracture within the formation based, at least in part, on a contrast agent within the fracture. The data acquisition unit 416 may control reception of the signals from the receivers 408a-n, and may cause the received signals to be stored in data buffer 418 until a complete set of signals is received at the control unit 402. Once the complete set of the signals is stored in the data buffer 418, the data processing unit 420 may either process the signals to determine certain fracture characteristics, or process the received signals for transmission to a surface control unit 160 through communication unit 422. In certain embodiments, the signals may be transmitted to the surface via a telemetry system.

The transmitters 404a-n and receivers 408a-n may either be disposed in a downhole tool with the control unit 402, or may be disposed in a cement layer securing a casing to the borehole, as described above. In such embodiments, the transmitters 404a-n and receivers 408a-n may communicate with control unit 402 via wired or wireless connections. Likewise, in certain embodiments, the fracture sensing system 400 may comprise a fracturing/injection subsystem 414. The fracturing/injection subsystem 414 may, for example, fracture a formation using a contrast agent as a proppant in the fracture fluid, or inject the contrast agent into existing fractures within the formation. In either case, the control unit 402 may be operable to control the magnetization of the casing to ensure that the contrast agent is effectively injected into the fractures, instead of congregating around the casing.

Figure 5:
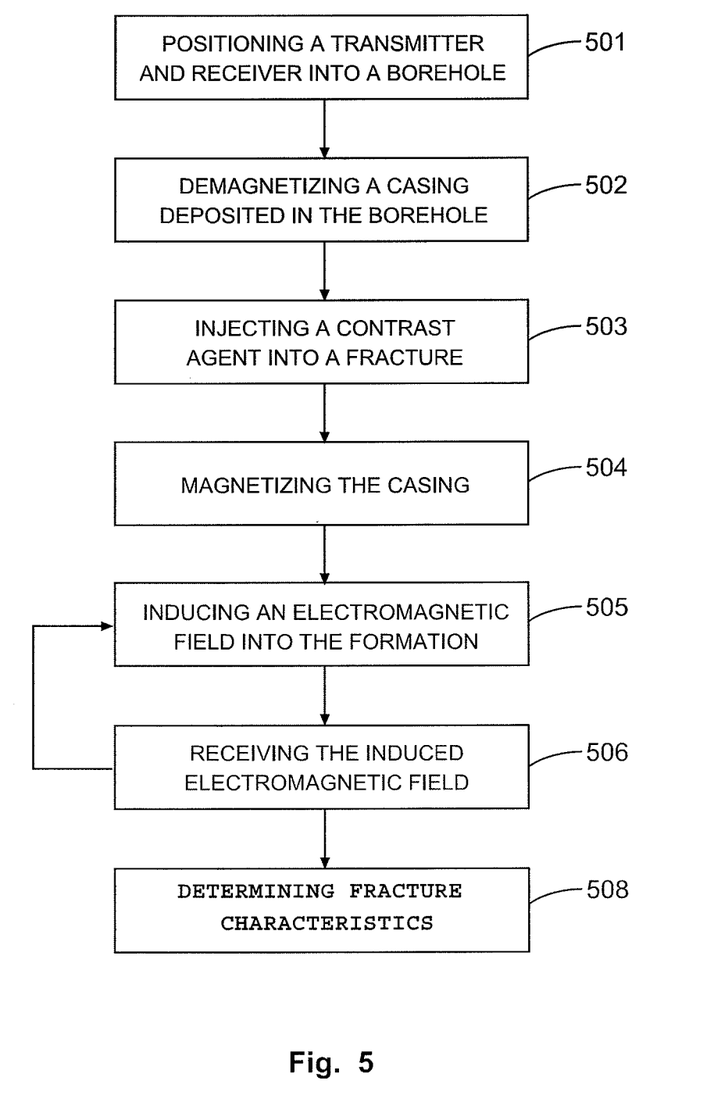

FIG. 5 illustrates an example fracture sensing method, according to aspects of the present disclosure. Step 501 includes positioning a transmitter and a receiver in a borehole. As described above, positioning the transmitter and receiver in the borehole may comprise, for example, positioning a tool comprising the transmitter and receiver in the borehole or positioning the transmitter and the receiver in a cement layer securing a casing to a borehole wall. Step 502 may comprise demagnetizing the casing. As described above, a magnetized casing may make the injection of a contrast agent into a fracture of the formation less effective. Step 503 may comprise injecting a contrast agent into a fracture extending from the borehole. The step of injecting the contrast agent into a fracture extending from the borehole may be accomplished, for example, during a combined perforation/fracturing operation, during a separate fracturing operation, or during a separate injection operation specifically for injecting the contrast agent into the fractures. The contrast agent may comprise, for example, a material with a high magnetic susceptibility, may be included as a proppant in a fracturing fluid, or may comprise a nanomaterial or nanoparticle designed to increase the electromagnetic visibility of a fracture.

Step 504 may comprise magnetizing the casing. As described above, magnetizing the casing may reduce electromagnetic field attenuation through the casing by magnetically saturating the casing. Magnetizing the casing may include introducing a permanent magnetic into the borehole, which may be located on a dedicated tool, or mechanically activating an electromagnet that is located on a fracture sensing tool similar to those described above. Step 505 may comprise inducing with the transmitter a first electromagnetic field in a formation surrounding the borehole. As described above, a control unit may cause the transmitter to induce the electromagnetic field, which may permeate a formation and fracture extending from the borehole. Step 506 may include receiving the first induced electromagnetic field at the receiver. Depending on the location of the sensors, e.g. internal or external to the casing, the induced electromagnetic field may either pass through the casing or not. The induced electromagnetic field may be used to identify a fracture within the formation based, at least in part, on the contrast agent within the fracture.

The method may also include repeating steps 505 and 506, as indicated by arrow 507, with the repetition comprising different steps depending on the configuration of the fracture sensing system. For example, if the transmitter and receiver are located on a fracture sensing tool, the tool, and therefore the transmitter and receiver, may be repositioned within the borehole. A second electromagnetic field may be induced in the formation, but at a different location than the first electromagnetic field, and the receiver may receive the second induced electromagnetic field. The second induced electromagnetic field may then be used, at least in part, to determine a fracture characteristic of a fracture within the formation. In contrast, if the transmitter and the receiver are positioned within the cement layer securing the casing to the borehole, and therefore stationary, step 507 may include inducing with the transmitter a second electromagnetic field in the formation at a pre-determined time after inducing the first electromagnetic field, receiving the second induced electromagnetic field at the receiver; and determining a fracture characteristic of the fracture based, at least in part, on the second induced electromagnetic field.

Step 508 may comprise determining a fracture characteristic of the fracture based, at least in part, on the first induced electromagnetic field. If additional electromagnetic fields were induced in the formation, those electromagnetic fields may also be incorporated into the determination. In certain embodiments, the fracture characteristics described above may comprise at least one of a fracture orientation, a fracture height, a fracture width, a fracture length, and a fracture shape. Determining a fracture characteristic may be accomplished, for example, using an inversion technique. The inversion technique may include translating the received signals into the fracture characteristics, and may be carried out using a database constructed via numeric or analytic modeling of an expected range of parameters. For example, the width of the fracture may have a linear relationship with the signal level at low frequencies. Likewise, the height of the fracture may be determined from the height of the magnetic contrast agent versus the depth of the fracture. Other inversion techniques would be appreciated by one of ordinary skill in view of this disclosure.

In certain embodiments, the method may also include determining a temperature of the formation based, at least in part, on the first induced electromagnetic field. For example, determining a temperature of the formation may include using superparamagnetic nanoparticles as contrast agents and inducing an electromagnetic field in the formation with a signal that slowly increases in frequency from DC to at least the lowest frequency at which superparamagnetism in the nanoparticles fails to exist. Using the above conditions, the temperature in Kelvin may be determined using the following equation:

$$T_B = (K*V)/(k_B * ln(1/(F_1 * \tau_0))),$$

with K being the nanoparticle's magnetic anisotropy energy density and V being the volume, so that their product is the energy barrier associated with flipping of the magnetic particles; $k_B$ being the Boltzmann constant; $\tau_0$ being the attempt period; and $F_1$ being the lowest frequency at which the superparamagnetism signal is no longer observed.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A fracture sensing method, comprising:
   positioning a transmitter and a receiver in a borehole, wherein positioning the transmitter and the receiver in the borehole comprises positioning the transmitter and the receiver in a cement layer between a casing and a borehole wall, wherein the cement layer secures the casing to the borehole;
   magnetizing the casing disposed within the borehole;
   inducing with the transmitter an electromagnetic field in one or more fractures of a formation extending from the borehole while the casing is magnetized without passing through the casing;
   receiving the induced electromagnetic field at the receiver, wherein the induced electromagnetic field identifies a fracture within the formation based, at least in part, on a contrast agent within the fracture, the contrast agent operable to provide electromagnetic visibility of the fracture;
   identifying a fracture characteristic of the fracture based, at least in part, on an inversion technique that translates the received induced electromagnetic field into the fracture characteristic, wherein the fracture characteristic comprises a fracture width; and
   determining a temperature of the formation based, at least in part, on the received induced electromagnetic field.

2. The fracture sensing method of claim 1, wherein magnetizing the casing comprises positioning a tool comprising a magnet within the borehole.

3. The fracture sensing method of claim 1, wherein magnetizing the casing comprises mechanically activating a magnet positioned proximate to the casing.

4. The fracture sensing method of claim 1, wherein positioning the transmitter and the receiver in a borehole comprises positioning a tool comprising the transmitter and the receiver within the borehole.

5. The fracture sensing method of claim 1, wherein the transmitter and the receiver each comprise an electric dipole.

6. The fracture sensing method of claim 1, further comprising demagnetizing the casing and injecting the contrast agent into the fracture while the casing is demagnetized.

7. The fracture sensing method of claim 6, wherein the contrast agent comprises a nanomaterial.

8. The fracture sensing method of claim 1, wherein the contrast agent comprises a material with high magnetic susceptibility.

9. A fracture sensing system disposed within a borehole, comprising:
an electromagnet;
a casing disposed within the borehole
a transmitter and a receiver positioned in a cement layer between the casing and a borehole wall, wherein the cement layer secures the casing to the borehole; and
a control unit coupled to the electromagnet, the transmitter, and the receiver, wherein the control unit:
causes the electromagnet to magnetize the casing;
causes the transmitter to induce an electromagnetic field in one or more fractures of a formation extending from the borehole while the casing is magnetized without passing through the casing;
receives the induced electromagnetic field through the receiver, wherein the induced electromagnetic field identifies a fracture within the formation based, at least in part, on a contrast agent within the fracture, the contrast agent operable to provide electromagnetic visibility of the fracture;
identifies a fracture characteristic of the fracture based, at least in part, on an inversion technique that translates the received induced electromagnetic field into the fracture characteristic, wherein the fracture characteristic comprises a fracture width; and
determines a temperature of the formation based, at least in part, on the received induced electromagnetic field.

10. The fracture sensing system of claim 9, further comprising a fracturing system coupled to the control unit, wherein the fracturing system injects the contrast agent into the fracture.

11. The fracture sensing system of claim 10, wherein the contrast agent comprises a proppant.

12. The fracture sensing system of claim 10, wherein the contrast agent comprises a material with high magnetic susceptibility.

13. The fracture sensing system of claim 9, further comprising an insulative layer positioned between the casing and at least one of the transmitter and the receiver.

14. The fracture sensing method of claim 9, wherein the transmitter and the receiver each comprise an electric dipole.

15. A fracture sensing method, comprising:
positioning a transmitter and a receiver in a borehole;
demagnetizing a casing disposed in the borehole prior to injecting a contrast agent into a fracture extending from the borehole, wherein the cement layer secures the casing to the borehole;
injecting the contrast agent into the fracture extending from the borehole, the contrast agent operable to provide electromagnetic visibility of the fracture;
magnetizing the casing;
inducing with the transmitter a first electromagnetic field in one or more fractures of a formation extending from the borehole without passing through the casing;
receiving the first induced electromagnetic field at the receiver;
identifying a fracture characteristic of the fracture based, at least in part, on an inversion technique that translates the first received induced electromagnetic field into the fracture characteristic, wherein the fracture characteristic comprises a fracture width; and
determining a temperature of the formation based, at least in part, on the first received induced electromagnetic field.

16. The fracture sensing method of claim 15, wherein the fracture characteristic comprises at least one of a fracture orientation, a fracture height, a fracture length, and a fracture shape.

17. The fracture sensing method of claim 15, further comprising:
repositioning the transmitter and the receiver;
inducing with the transmitter a second electromagnetic field in the formation;
receiving the second induced electromagnetic field at the receiver; and
determining a fracture characteristic of the fracture based, at least in part, on the first induced electromagnetic field and the second induced electromagnetic field.

18. The fracture sensing method of claim 15, further comprising:
inducing with the transmitter a second electromagnetic field in the formation at a pre-determined time after inducing the first electromagnetic field;
receiving the second induced electromagnetic field at the receiver; and
determining a fracture characteristic of the fracture based, at least in part, on the first induced electromagnetic field and the second induced electromagnetic field.

19. The fracture sensing method of claim 18, wherein the transmitter and the receiver are positioned in a cement layer between the casing and a borehole wall.

20. The fracture sensing method of claim 15, wherein the contrast agent comprises a material with high magnetic susceptibility.

* * * * *